April 26, 1938. E. L. PFLANZ 2,115,232
FILTER
Filed July 15, 1935 2 Sheets-Sheet 1

Inventor:
Ernst L. Pflanz
By Williams, Bradbury, McCaleb & Hinkle
Attys.

April 26, 1938. E. L. PFLANZ 2,115,232
FILTER
Filed July 15, 1935 2 Sheets-Sheet 2
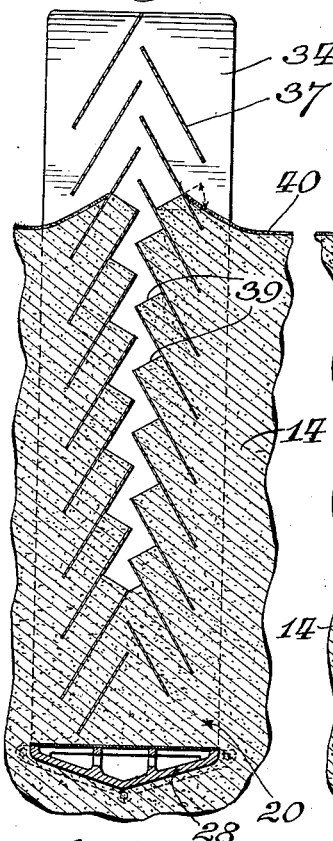
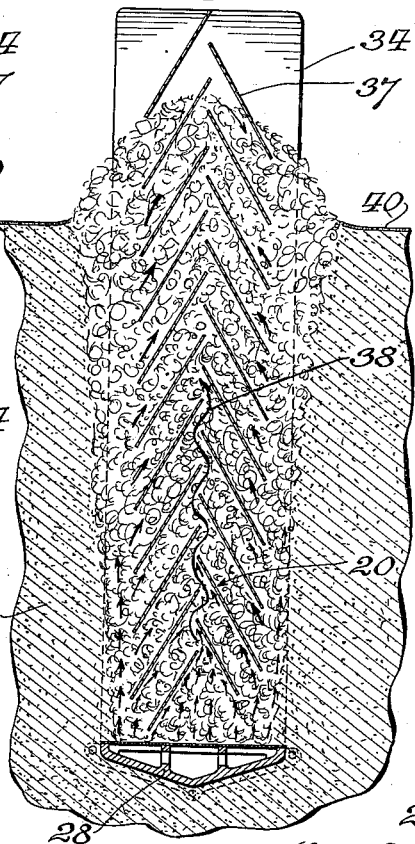
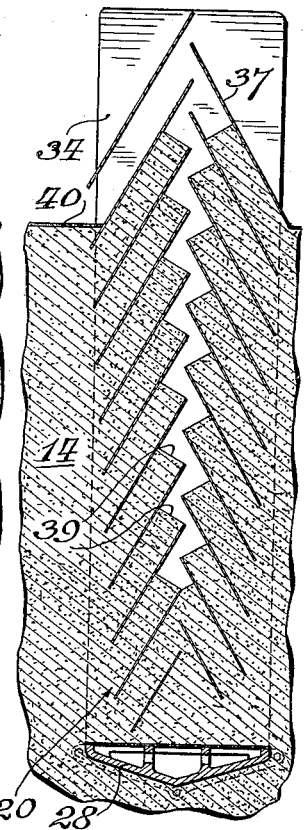
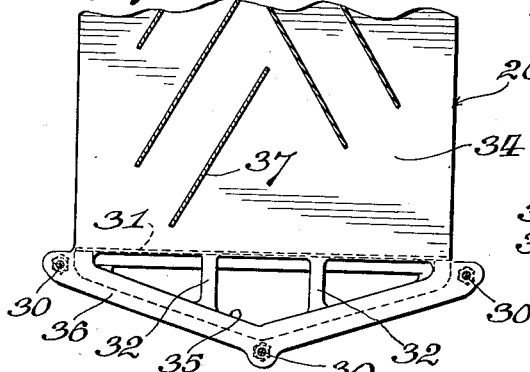
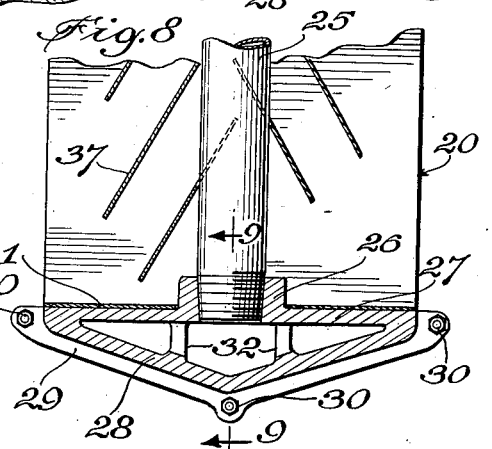
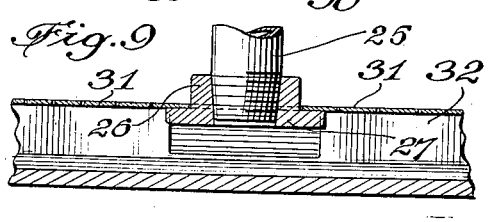
Inventor:
Ernst L. Pflanz
By Williams, Bradbury,
McCaleb & Hinkle.
Attys.

Patented Apr. 26, 1938

2,115,232

UNITED STATES PATENT OFFICE 2,115,232

FILTER

Ernst L. Pflanz, Glencoe, Ill.

Application July 15, 1935, Serial No. 31,317

13 Claims. (Cl. 210—130)

This invention relates to filters and particularly to sand filters suitable for use in the preparation of water for drinking purposes.

Such filters normally comprise a filter basin in which a bed of sand is supported on a layer of graded gravel. The water to be filtered is supplied above the sand bed and is withdrawn by suitable perforated pipes located in the gravel bed.

When the filter becomes fouled it must be washed and this washing is normally effected by introducing water under pressure by the outlet pipes, which water ascends upwardly through the sand bed, converting it into an ebulliting mass of quicksand. The rapid movements of the sand particles and their collisions have the effect of removing dirt from the particles, which dirt is carried away by the wash water.

One effect of such washings is to subject the sand to repeated hydraulic gradation and the inevitable distribution of the finest particles of sand at or near the top surface. The result of this location of the finest sand is that the top surface has a very effective filtering or straining action and the filter becomes choked by a superficial skin of dirt, the "schmutzdecke", at a time when the filtering ability of the main body of sand is only slightly, if at all, impaired.

Efforts have been made to remove the finest sand, with the expectation of avoiding excessive filtering at the surface. Such efforts have been without success because fine sand is produced by attrition during washing and only a very small quantity is necessary to fill in the interstices between sand particles of normal size, resulting in somewhat excessive filtration at the surface.

In my copending patent application Serial No. 708,179, filed January 25, 1934, I have described and claimed a filter which is provided with perforated channelers which extend above and below the level of the sand surface. These channelers have the effect of providing a suitably greater filtering surface, and also of providing a filtering surface which is substantially devoid of the fine particles.

According to the present invention I provide means for producing in the sand an increased filtering surface, which is free and exposed directly to the water to be filtered without the intervention of perforated walls or the like. This free surface of sand is substantially free from the objectionable fine sand so that the free filtering surfaces thus provided have an enhanced filtering capacity, permitting filtration to be exerted not merely at the surface of the sand, but also to a greater extent within the body of sand at some distance from the surface.

In the preferred form of my invention, I provide an apparatus which may be readily and expeditiously installed in existing sand filters and which may be readily removed therefrom for the purpose of repair and replacement.

This apparatus will be fully understood from the following description of preferred embodiments thereof, taken in conjunction with the accompanying drawings, in which:

Fig. 4 is a sectional detail view, taken on the line 4—4 of Fig. 1, on a somewhat larger scale;

Fig. 5 is a view similar to Fig. 4, showing the manner in which the sand supporting element is cleansed;

Fig. 6 is a view similar to Fig. 4, showing a somewhat modified form of sand supporting element;

Fig. 7 is a fragmentary sectional detail view, taken on the line 7—7 of Fig. 1, on a larger scale than Fig. 4;

Fig. 8 is a similar view, taken on the same line as Fig. 4, and

Fig. 9 is a fragmentary sectional detail view, taken on the line 9—9 of Fig. 8.

Figure 1:
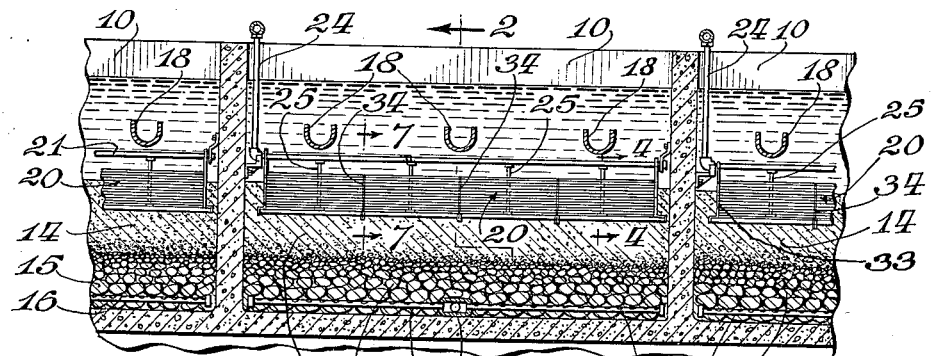
Figure 1 is a sectional elevation through a series of filters embodying my invention.

Referring to the drawings, the reference numeral 10 designates the filter basin, which may suitably be of concrete. Adjacent one side, the basin is provided with a wall 11 which extends from the bottom of the basin upwardly to a height substantially below that of the side walls of the basin. The wall 11 forms with the adjacent wall of the basin, a channel 12 for filter wash water. The channel 12 is drained by a pipe 13 provided with a suitable valve (not shown). Between the wall 11 and the opposite wall of the basin is located the filter bed 14 of sand which is supported by a bed of gravel 15, the size of which is graduated, the larger sizes being located at the bottom. At the bottom are located perforated draw-off pipes 16 which connect to manifold 17, which convey the filtered water away to suitable storage basins (not shown).

Above the sand bed 14 are placed horizontal overflow troughs 18 which are supported between the wall 11 and the opposite wall of the filter basin. These troughs are adapted to receive wash water when the filter is being washed and convey it into the channel 12.

Figure 2:
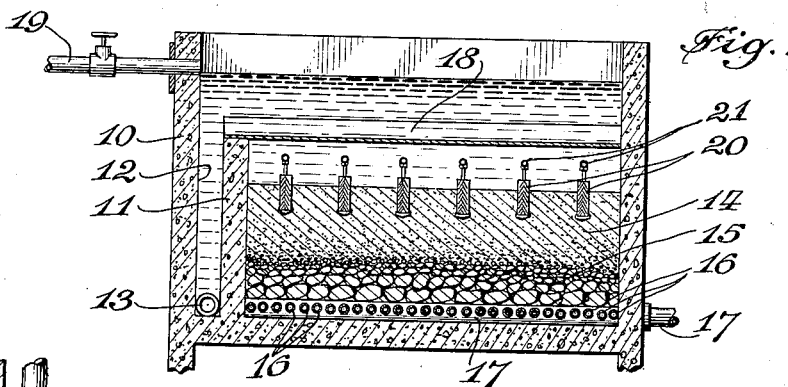
Fig. 2 is a transverse sectional elevation, taken on the line 2—2 of Fig. 1.
Figure 3:
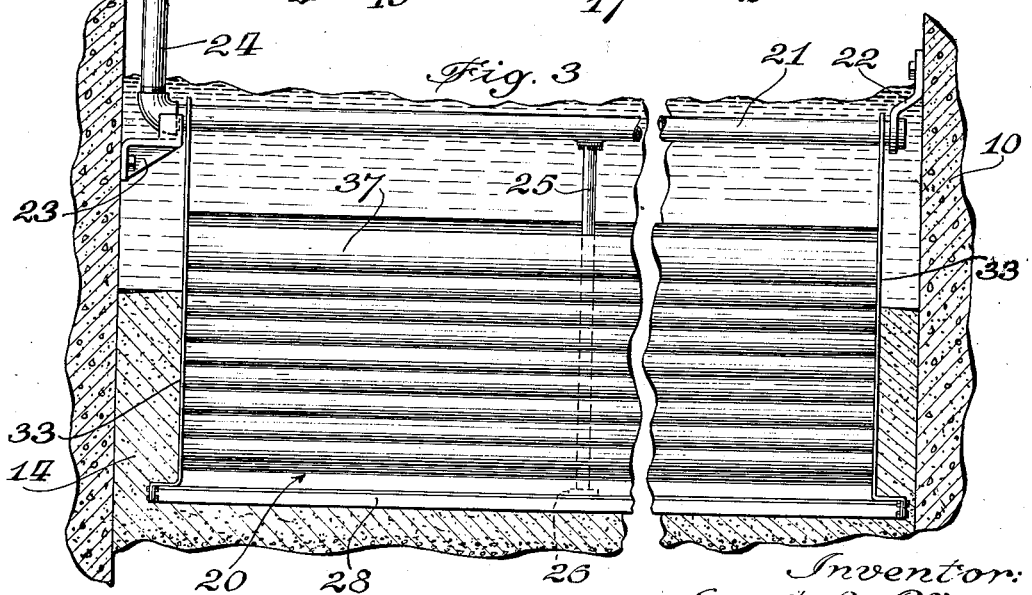
Fig. 3 is a fragmentary sectional detail showing one of my sand supporting elements on a larger scale, the intermediate portion being broken away.

The water to be filtered is supplied by the feed pipe 19 which is adapted to fill the basin in the manner indicated in Fig. 2. It will be understood that during filtering, the valve in the pipe 13 is closed and that the water passes through the sand bed 14, gravel bed 15 and perforated pipes 16 into the manifold 17.

I provide in each filter basin 10 a suitable number of sand supporting elements 20 which will now be described. Each element 20 provides a support for sand so as to establish a channel in which areas or surfaces of free sand are presented for the admission of water being filtered. For reasons which will hereinafter be more fully pointed out, these free areas or surfaces are characterized by a substantial absence of fine sand particles which have the effect of accelerating the sealing of the filter by "schmutzdecke". As will also be more fully explained, means are provided in each sand supporting element so that the same may be subjected to localized washing, whereupon filtering may be continued. In this way the need for a general washing of the filter can be postponed repeatedly with great economy of washing water.

My improved sand supporting element comprises vertical series of plates laid obliquely. Two such series are located near each other with their plates diverging downwardly after the manner of a herring-bone pattern. The upper ends of the plates of the two series are in spaced relation so that a channel is formed which aids in the formation of the free areas or surfaces of sand referred to. The two series of plates extend into the sand and the spaces between adjacent plates of the same series are filled, for the most part, with sand. At the upper ends of these spaces the sand takes its natural angle of repose and thus forms the free surface referred to.

The sand supporting element and the sand contained therein and adjacent thereto may be thoroughly washed by merely supplying water below the element. This water moves upwardly around and between the louver-like plates and between the two series of plates. In this way, any impurities filtered out by the water, and also any fine sand, are elevated and automatically thrown away from the sand supporting element by the action of the upper louvers. These louvers effectively prevent the return of such dirt and fine sand. When wash water is thus injected, the sand in and around the sand supporting element is transformed into an ebulliting mass of quicksand, and the mutual collisions of the grains of sand effectively remove any adhering impurities. When the water is shut off, the dispersed sand within and around the louver plates settles down vertically; but the lower edges of the louver plates prevent the sand on the outside from filling the spaces between the louver plates. These spaces are available for the dispersed sand within the louver plates and this sand settles within these spaces, leaving a zigzag channel free of sand and open to the superambient layer of water.

The sand supporting element shown comprises a horizontal pipe 21 supported on brackets 22 and 23 carried by the basin 10. One end of the pipe 21 is closed, the other end is connected to a supply pipe 24 through which is supplied the water for the cleansing of the sand supporting element. Pipes 25, in any suitable number, are secured in depending and equally spaced relation from the pipe 21. Each pipe 25 is threaded into a boss 26 in a bridge member 27 which extends across the upper face of a trough member 28. At each end the trough member 28 is provided with a flange 29. The contiguous flanges 29 of the trough member 28 are connected by bolts 30 so as to form a continuous trough along the line of the sand supporting element. The upper ends of the trough members 28 are closed by means of perforated plates 31 which rest on the upper edges of the sides of the trough member and on the upper edges of intermediate webs 22. The intermediate webs 32 are provided with openings so that the water supplied downwardly by the pipes 25 may be distributed uniformly within the trough elements 28, from which it escapes upwardly through the perforated plates 31.

The ends of the trough members 28 at the extreme ends of the sand supporting element 20, are closed by means of plates 33 which extend upwardly beyond the pipe 21 and are provided with openings through which that pipe passes. A further vertical plate 34 is located at each connection between contiguous trough members 28. The plates 34 terminate somewhat below the pipe 21 and at their lower ends they are provided with an opening 35, best shown in Fig. 7, which conforms to the interior of the trough members 28. Each plate 34 carries a flange 36 which conforms in shape to the flanges 29 of the trough members 28. This flange is interposed between adjacent trough members 28 during assembly and the bolts 30 pass therethrough. The plates 33 and 34 serve as supports for the inclined or louver plates 37. These plates are in the form of slats which extend in the longitudinal direction of the sand supporting element from one plate 33 or 34 to the next. The plates 37 slope downwardly and outwardly in the transverse direction of the sand supporting element from the vicinity of the longitudinal central vertical plane of the sand supporting element. As will readily be seen from Figs. 4 to 8, there are two series of such plates, one on each side of said central plane. The upper ends of the plates 37 of each series are in spaced relation so that a free passage is provided in the upward direction, as shown by the sinuous arrow 38 on Fig. 5. It may here be noted that I do not intend to be limited to plates having their upper edges in the same vertical plane, since the location of the edges otherwise does not detract from the distinctive operation of this invention, provided that the two series of plates 37 are reasonably near each other. In other words, the upper ends of the plates shown in Figs. 4 and 5 may be extended or reduced within wide limits without departing from my invention. The series of plates or louvers 37 extend from a point near the trough elements 28 upwardly to some distance above the normal surface of the sand.

In the modification of the invention shown in Figs. 4 and 5, the lower and outermost edges of the plates 37 are located in vertical planes. In the embodiment shown in Fig. 6, the plates are progressively longer, with the result that their lower or outermost edges are located on planes which diverge outwardly and upwardly. This latter construction has the improved merit of causing a greater supply of the wash water to enter into the spaces between adjacent louvers 37 during washing or cleansing of the sand supporting element.

The operation is as follows: The sand supporting elements being installed in the manner above described, the valves are open to admit water from pipes 24 into the trough elements 28. This wash water passes upwardly through the sand contained between the adjacent louvers 37 and also the adjacent sand, as suggested in Fig. 5. The incoming water transforms this sand into an ebulliting mass of quicksand and a certain part of the sand is carried upwardly and discharged laterally between the uppermost louvers owing to the increased volume of quicksand over the compact sand from which it has been formed. It will be noted that there is an especially strong current passing upwardly through the sinuous passage 38 and that this strong current is particularly adapted to carry away any fine and comminuted sand so that this sand is discharged on the surface of the sand bed on either side of the sand supporting element.

When the water supply to the pipe 24 is turned off, the ebulliting mass of sand settles by gravity into the state shown in Fig. 4. That is, the sand which is located in the sinuous passage 38 settles and compacts for the most part into the spaces between adjacent louvers 37. The sand establishes itself between adjacent louvers on its natural angle of repose and thus forms two series of free filtering surfaces, which are designated 39 in Figs. 4 and 6. It will be noted that there is a free passage extending between the two series of louvers and open to the superambient layer of water. This passage extends nearly down to the washing trough elements 28, but I have found that the sand fills up sufficiently to prevent the formation of free surfaces between the lowermost and next lowermost louvers of each series. It may be noted that the water supplied by the pipe 24 need not be filtered water, but may be part of the supply which is to be filtered. This arises because this water has to pass through the large thickness of the sand layer before it can possibly reach the pipes 16 and 17.

The filter is operated in substantially the same manner as an ordinary sand filter. That is, the valve in the pipe 13 is closed, the filter is supplied with water by the pipe 19, and the valve in the pipe 17 is opened to permit the filtered water to pass off. The water percolates through the sand bed 14 and owing to the presence of the extremely fine sand on the surface of the sand bed, the "schmutzdecke" 40 forms upon the surface of the sand bed in a relatively short time. As is well known to those skilled in the art, this time depends upon many factors and primarily depends upon the season of the year and the resulting algae content of the water supply. The water also enters the sand bed through the filtering surfaces 39. These surfaces provide a greatly increased filtering area for the filter. Furthermore, as has been pointed out above, they are substantially devoid of very fine sand particles. The result is that the filtering is not confined to the surface of the sand to anything like the extent which prevails at the horizontal surface of the sand bed. As a result, the surfaces 39 do not become sealed by "schmutzdecke" until a longer period of operation has elapsed. When, however, the filtering rate of the filter becomes excessively low, a certain amount of water is supplied by the pipe 24 so as to convert the sand in and around the sand supporting element into the ebulliting mass of quicksand previously described. The upward passage of the wash water carries the dirt upwardly and leaves the surfaces 39 and the adjacent sand in condition for continued filtration.

This procedure may be continued for a long time, for example, until the sand supporting elements have been washed five or six times. Then it becomes necessary to apply a general wash to the filter, which may be done in the usual manner, that is, by opening the valve in the pipe 13 and supplying filtered water under pressure through the pipe 17. This general wash has the effect of thoroughly agitating the complete sand bed 14, and dirt and scum, including the "schmutzdecke" is delivered into the troughs 18 from which it is discharged into the passage 12 to the pipe 13. After this general washing, the sand supporting elements 20 are subjected to a localized wash for the purpose of establishing the free surfaces 39 above referred to. The basin 10 is then filled with water and filtration is resumed.

Although the invention has been disclosed in connection with the specific details of preferred embodiments thereof, it must be understood that such details are not intended to be limitative of the invention except in so far as set forth in the accompanying claims.

Having thus described my invention, what I claim as new and desire to secure by Letters Patent of the United States is:

1. A filter comprising a basin adapted to contain liquid to be filtered, a filtering bed of sand in the lower part of said basin, individually spaced members defining an open channel extending from the space above the sand bed downwardly into said bed and supporting sand therein with free surfaces exposed to said channel, and water supplying means having a large effective water discharging area below and extending completely under said channel forming members whereby washing water may be caused to pass between said members into said channel to disturb and clean the sand forming said free surfaces.

2. A filter comprising a basin adapted to contain liquid to be filtered, a filtering bed of sand in the lower part of said basin, parallel louver elements in superimposed spaced relation defining a channel extending from the space above the sand bed into the bed, said louver elements supporting sand with free surfaces exposed to said channel, and means below said louver elements for supplying water upwardly between adjacent parallel louvers into said channel whereby washing water may be caused to pass between said louvers.

3. A filter comprising a basin adapted to contain liquid to be filtered, a filtering bed of sand in the lower part of said basin, an adjacent pair of series of elements defining between them an open channel extending from the space above the bed downwardly into said bed, said elements supporting between them sand with free surfaces exposed to said channel, and means below both series for supplying water upwardly between the elements of each series into said channel.

4. A filter comprising a basin adapted to contain liquid to be filtered, a filtering bed of sand in the lower part of said basin, a pair of adjacent series of superimposed spaced louvers defining a channel extending from the space above the bed downwardly into the bed, said louvers supporting sand with free surfaces exposed to said channel, and means below both series for supplying water upwardly between the louvers of each series into said channel.

5. A filter comprising a basin adapted to contain liquid to be filtered, a filtering bed of sand in the lower part of said basin, and a pair of adjacent series of superimposed louvers in spaced relation defining a channel extending from the space above the bed downwardly into the bed, said louvers supporting sand with free surfaces exposed to said channel, the upper ends of the louvers of one series being in substantial vertical alignment with, and in alternating relation to the upper ends of the other series, and said louvers diverging downwardly and outwardly.

6. A filter comprising a basin adapted to contain liquid to be filtered, a filtering bed of sand in the lower part of said basin, and a pair of adjacent series of superimposed louvers in spaced relation defining a zig-zag channel extending from the space above the bed downwardly into the bed, said louvers supporting sand with free surfaces exposed to said channel, the upper parts of the louvers extending into a vertical plane and the louvers of one series being staggered relatively to the louvers of the other series to provide said channel and said louvers diverging downwardly and outwardly therefrom.

7. A filter comprising a basin adapted to contain liquid to be filtered, a filtering bed of sand in the lower part of said basin, and a pair of adjacent series of superimposed louvers in spaced relation defining a channel extending from the space above the bed downwardly into the bed, said louvers supporting sand with free surfaces exposed to said channel, the upper ends of the louvers extending into a vertical plane and being located in spaced relation to provide said channel, and said louvers diverging downwardly and outwardly therefrom, said louvers being progressively longer in the upward direction of the series.

8. A filter comprising a basin adapted to contain liquid to be filtered, a filtering bed of sand, a series of louvers defining an open channel extending downwardly from the space above the bed into said bed and supporting sand therein with free surfaces exposed to said channel, and water supply means having a large effective water discharging area located below and extending beyond said louvers on both sides adapted to supply water upwardly between adjacent louvers to wash the sand contained therebetween and remove dirt and fine sand therefrom upwardly through said channel.

9. A filter comprising a basin adapted to contain liquid to be filtered, a filtering bed of sand in the lower part of said basin, an adjacent pair of series of louvers defining between them an open channel extending downwardly from the space above said bed into said bed, said elements supporting between them sand with free surfaces exposed to said channel, and water supply means located below each of said series of louvers adapted to supply water upwardly between the adjacent louvers of each series to wash the sand contained therebetween and remove dirt and fine sand therefrom upwardly through said channel.

10. A filter comprising a basin adapted to contain liquid to be filtered, a filtering bed of sand, a pair of adjacent series of superimposed louvers in spaced relation defining a channel extending from the space above the bed downwardly into the bed, said louvers supporting sand with free surfaces exposed to said channel, and water supply means below each series of louvers adapted to supply water upwardly between the adjacent louvers of each series to wash the sand contained therebetween and remove dirt and fine sand therefrom upwardly through said channel.

11. A filter comprising a basin adapted to contain liquid to be filtered, a filtering bed of sand in the lower part of said basin, a pair of adjacent series of superimposed louvers in spaced relation defining a channel extending from the space above the bed downwardly into the bed, said louvers supporting sand with free surfaces exposed to said channel, the upper ends of the louvers of each series being located adjacent a common plane and in spaced relation, and said louvers diverging downwardly and outwardly, and water supply means below said louvers adapted to supply water upwardly between adjacent louvers of each series to wash the sand contained therebetween and remove dirt and fine sand therefrom upwardly through said channel.

12. A filter comprising a basin adapted to contain liquid to be filtered, a filtering bed of sand in the lower part of said basin, a pair of adjacent series of superimposed louvers in spaced relation defining a zig-zag channel extending from the space above the bed downwardly into the bed, said louvers supporting sand with free surfaces exposed to said channel, the upper ends of the louvers of both series being substantially located in a common vertical plane and in spaced relation to provide said channel, and said louvers diverging downwardly and outwardly therefrom and water supply means below each series of louvers adapted to supply water upwardly between the louvers to wash the sand contained therebetween and remove dirt and fine sand therefrom upwardly through said channel.

13. A filter comprising a basin adapted to contain liquid to be filtered, a filtering bed of sand in the lower part of said basin, a pair of adjacent series of superimposed louvers in spaced relation defining a channel extending from the space above said bed downwardly into the bed, said louvers supporting sand with free surfaces exposed to said channel, the upper ends of the louvers of both series extending at least into a common vertical plane and being located in spaced relation to provide said channel, and said louvers diverging downwardly and outwardly therefrom, said louvers being progressively longer in the upward direction of the series, and water supply means below each series of louvers adapted to supply water which washes the sand contained between the louvers and removes dirt and fine sand therefrom.

ERNST L. PFLANZ.